Patented June 11, 1940

2,204,326

UNITED STATES PATENT OFFICE 2,204,326

OIL-INSOLUBLE REACTION PRODUCT OF AN ALKANOL AMINE AND PETROLEUM SULPHONIC ACIDS

Karl T. Steik, Montclair, N. J., assignor to Standard Oil Development Company, a corporation of Delaware No Drawing. Application November 20, 1936, Serial No. 111,845

5 Claims. (Cl. 260—501)

This invention relates to a novel sulphonate soap and method of using same as an emulsifying agent and it relates more particularly to the product of the process claimed in co-pending application, Serial No. 372,529 filed June 20, 1929, which issued as U. S. Patent No. 2,061,601, November 24, 1936, of which the present application is a continuation in part.

It is an old practice in the refining of oils to treat the oil with strong sulphuric acid. Such treatment is usual in the refining of lubricating oils, in the preparation of the so-called "white oils," etc. The strong sulphuric acid causes sulphonation of certain hydrocarbons. These sulphonic acids derived from petroleum are partly soluble in the oil, partly insoluble. The former remain dissolved in the petroleum oil while the latter are found in the sludge. The acid oil containing oil-soluble sulphonic acids is neutralized with ethanol-amine or with some other alcoholamine. The ethanol-amine is obtainable on the market in the form of a glycerine-like viscous liquid and usually consists of a mixture of mono-, di-, and tri-ethanol-amine. In this process other alcohol-amines may be used such as, for instance, propanol-amines, etc. The neutralization is carried out by adding the amine to the oil in small quantities at a time until the oil shows a slightly alkaline reaction. During this operation the oil is vigorously agitated and the temperature is raised slowly to about 80° C. After the neutralization is completed the agitation is continued for about two hours. At the end of this time the oil should still show alkaline reaction, if not, more ethanol-amine is added. The oil is then allowed to settle, preferably over night. The bulk of the ethanol-amine soaps formed with the sulphonic acids separates out and the rest may be washed out with water or with some organic solvent such as isopropyl alcohol, etc.

The oil to be treated with the sulphuric acid may range in viscosity from about 65 to 500 seconds Saybolt at 100° F. and may be obtained from various crude oils, the properties of the resulting sulphonates being dependent to some extent upon the source of the crude as well as the viscosity of the fraction treated and the conditions of the sulphonating treatment.

By the term "alcohol amine" is intended to be included the mono-, di-, or tri-alkylol or arylol amines such as diethanolamine, monomethanol diethanolamine, dimethyl monomethanolamine, diphenylamine, etc. Also higher molecular weight amines containing about 5 to 20 carbon atoms or so, such as may be prepared from chlorhydrins of olefines or cracked wax, or from chlor fatty hydroxy acids, etc., may be used, whereby the sulphonate soaps derived therefrom are soluble to some extent in mineral oils.

The alcohol amines may be represented by the general chemical formula $NX_{(3-n)}(R'OH)_n$, where X is alkyl, aryl or hydrogen, and $n$ is 1, 2 or 3 and R' is an alkylene group such as ethylene $C_2H_4$, propylene $C_3H_6$, amylene $C_5H_{10}$, etc.

The amount of alcohol amine necessary for the neutralization depends on the nature of the amine employed and the percentage of sulphonic acids present in the acid oil, and may vary within wide limits. However, this amount can be easily determined in each case since it is necessary to determine only the point when the reaction of the oil becomes alkaline.

The alcohol amine sulphonate soap resulting from the above described process probably has the following general chemical formula:

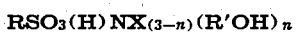
$$RSO_3(H)NX_{(3-n)}(R'OH)_n$$

which is merely a combination of the above formula for the alcohol amines together with the sulphonic acid general formula $RSO_3H$ in which R represents a sulphonatable hydrocarbon radical derived from the mineral oil by the sulphonating treatment. More specifically, the structural formula of the triethanolamine sulphonic acid soap is probably the following:

$$RSO_3NH(C_2H_4OH)_3$$

where R represents a sulphonatable hydrocarbon radical. The consistency and the color of these soaps may vary within quite wide limits. The crude soaps may have the consistency of beeswax at room temperature when they are obtained from an oil of about 225–250 seconds Saybolt viscosity at 100° F., or they may be like a thick syrupy liquid when obtained from an oil of 80–100 viscosity. The color of these soaps depends on the degree of purification of the oil previous to precipitating out of the sulphonic acids in form of the soaps, and it may vary from light amber to dark red.

These sulphonic soaps of the alcohol amines are soluble in water and alcohol but insoluble in oil and are good emulsifying agents for oil-in-water type emulsions. As disclosed and claimed in co-pending Steik and Fulton application, Serial No. 725,086 filed May 11, 1934, that issued as Patent No. 2,126,054 on August 9, 1938, also a continuation-in-part of application 372,-529, small amounts of these alcohol amine soaps may advantageously be added to alkali metal (e. g., sodium or potassium) oil-soluble sulphonate soaps which are relatively much cheaper, in order to increase the emulsifying properties of the latter. For example, about 10% of ethanolamine sulphonates, such as prepared above, is added to a batch of oil-soluble sulphonates having relatively poor emulsifying characteristics (whether the poor quality is due to the presence of impurities or due to the nature of the petroleum stock from which it was made). When added to Nujol, which is a commercial white oil, the latter formed an emulsion on shaking with water. Oil containing 1% or 2% of this mixture formed emulsions of the quick breaking type while an oil containing 4% or more of the mixture formed stable emulsions.

Although some alcohol amine sulphonate soaps have been prepared in the past by reconstituting sodium oil-soluble sulphonates, i. e., by treating the latter with sulphuric acid, separating the resulting upper sulphonic acid layer from the lower aqueous acid layer containing sodium sulphate and then neutralizing the sulphonic acids with an alcohol amine, it is difficult, if not practically impossible, to prepare pure alcohol amine sulphonate soaps substantially free from sodium soaps by that method, in view of the fact that there is an inherent tendency for some of the sodium compounds to carry through the process and be present in the finished product. Due to the presence of the sodium soaps and their solubility in oil, it has generally been considered that the alcohol amine sulphonate soaps are oil-soluble but according to the present invention it has now been found that if substantially pure soaps of oil-soluble sulphonic acids derived from petroleum are made as by the process claimed in the original application, Serial No. 372,529, referred to, the alcohol amine sulphonate soaps are substantially insoluble in oil. This is true at least when lower alcohol amines are used although it is possible by using higher molecular weight alcohol amines to make substantially pure yet oil-soluble alcohol amine soaps of oil-soluble sulphonic acids derived from petroleum.

The advantages of the invention will be still better understood from the following experimental data:

*Experiment 1*

About 1 gram of triethanol amine sulphonate (which was insoluble in oil) was dissolved in 50 ccs. of water and shaken up with an addition of about 10 ccs. of a refined mineral oil having a Saybolt viscosity of about 100 seconds at 100° F. A fairly stable emulsion resulted.

*Experiment 2*

A mixed emulsifying agent was prepared comprising a sample of the same triethanol amine sulphonate referred to in Experiment 1, and containing about 10% of oil-soluble sodium sulphonate. This mixture was found to be insoluble in oil.

*Experiment 3*

A mixed emulsifying agent containing about equal parts of triethanol amine sulphonate and oil-soluble sodium sulphonate was found to be soluble in oil and when oil solutions containing more than 8% of this mixed emulsifying agent were prepared they were found to emulsify readily when shaken with water.

*Experiment 4*

About 15% by weight of impure light sodium sulphonates (obtained by treating a light lubricating oil stock with strong sulphuric acid and neutralizing the resultant acid-oil layer with soda) was dissolved in a refined mineral oil having a Saybolt viscosity of about 100 seconds at 100° F. This solution when shaken with water did not produce satisfactory emulsions.

*Experiment 5*

Experiment 4 was repeated except that 5 out of the 15% of sodium sulphonates were replaced by triethanol amine sulphonate. The resulting solution emulsified readily and produced comparatively stable emulsions.

*Experiment 6*

A refined mineral oil solution containing 15% of impure light and heavy oil soluble sodium sulphonate (probably containing a large amount of mineral salts and other impurities which make emulsification difficult) was found incapable of producing emulsions with water.

*Experiment 7*

Experiment 6 was repeated except that 5% out of the 15% oil-soluble sulphonates were replaced by triethanol amine sulphonate and the resulting oil solution was found to emulsify readily with the production of emulsions which were fairly stable.

*Experiment 8*

A refined mineral oil solution containing 10% of purified mixed light and heavy oil-soluble sodium sulphonates was found to produce little emulsification except after long standing and shaking.

*Experiment 9*

Experiment 8 was repeated except that 2% out of the 10% of the sodium sulphonates were replaced by triethanol amine sulphonate and the resulting oil solution was found to emulsify readily with the production of emulsions which were fairly stable.

*Experiment 10*

A refined mineral oil solution containing about 10% of purified heavy oil-soluble sodium sulphonates was found to produce no emulsification except on long standing and then very slightly.

*Experiment 11*

Experiment 10 was repeated except that 3% out of the 10% of sulphonates were replaced by triethanol amine sulphonate and the resulting solution was found to emulsify readily with water with the production of fairly stable emulsions.

The above data indicate that this substantially pure triethanol amine sulphonate which in itself is insoluble in oil, is valuable not only as an emulsifying agent itself but as an addition agent for use in relatively small proportions for improving the emulsifying capacity of pure or impure oil-soluble sodium sulphonates.

It is not intended that this invention be limited to any of the specific examples which are merely given for the sake of illustration nor to any theories as to the operation of the invention, but only by the appended claims in which it is intended to claim all novelty inherent in the invention as broadly as the prior art permits.

I claim:

1. A product comprising essentially a substantially pure alkylol amine compound of oil-soluble sulphonic acids derived from petroleum, said compound being substantially free from metal compounds of such acids and insoluble in oil.

2. A product comprising essentially a substantially pure ethanol amine compound of oil-soluble sulphonic acids derived from petroleum, said compound being substantially free from metal compounds of such acids.

3. A substantially pure oil-insoluble compound of a lower alkylol amine and oil-soluble sulphonic acids derived from petroleum, said compound being substantially free from metal compounds of such acids.

4. Compound according to claim 3 made from sulphonic acids derived by strong sulphuric acid treatment of a petroleum oil fraction having a viscosity between the approximate limits of 65 and 500 seconds Saybolt at 100° F.

5. An emulsifying agent consisting essentially of a substantially pure oil-insoluble compound of triethanolamine and oil soluble sulphonic acids derived from petroleum, said emulsifying agent being substantially free from metal compounds of such acids.

KARL T. STEIK.